United States Patent
Yako et al.

(10) Patent No.: US 10,037,033 B2
(45) Date of Patent: Jul. 31, 2018

(54) VEHICLE EXTERIOR SURFACE OBJECT DETECTION

(71) Applicant: Ford Global Technologies, LLC, Dearborn, MI (US)

(72) Inventors: Sarra Awad Yako, Allen Park, MI (US); Kyle Richard Post, Dearborn, MI (US); Levasseur Tellis, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 37 days.

(21) Appl. No.: 15/182,965

(22) Filed: Jun. 15, 2016

(65) Prior Publication Data

US 2017/0364072 A1 Dec. 21, 2017

(51) Int. Cl.
G05D 1/00 (2006.01)
G01C 21/34 (2006.01)
G05D 1/02 (2006.01)

(52) U.S. Cl.
CPC ............ *G05D 1/0088* (2013.01); *G01C 21/34* (2013.01); *G05D 1/021* (2013.01); *G05D 2201/0212* (2013.01)

(58) Field of Classification Search
CPC ................. G05D 1/0088; G05D 1/021; G05D 2201/0212; G01C 21/34
USPC ......................................................... 701/1, 23
See application file for complete search history.

(56) References Cited

U.S. PATENT DOCUMENTS

| 6,163,250 | A | 12/2000 | Moskowitz |
| 6,621,411 | B2 | 9/2003 | McCarthy et al. |
| 6,841,767 | B2 | 1/2005 | Mindl et al. |
| 7,554,444 | B2 | 6/2009 | Rao |
| 2013/0002873 | A1* | 1/2013 | Hess ............... H04N 7/185 348/148 |
| 2015/0248131 | A1* | 9/2015 | Fairfield ........... G05D 1/0044 701/2 |

(Continued)

FOREIGN PATENT DOCUMENTS

| DE | 10018652 A1 | 12/2001 |
| GB | 2543161 A | 4/2017 |

OTHER PUBLICATIONS

UKIPO Search Report for Application No. GB1709385.7 dated Dec. 6, 2017 (3 pages).

*Primary Examiner* — Jaime Figueroa
(74) *Attorney, Agent, or Firm* — Frank A. MacKenzie; Bejin Bieneman PLC

(57) ABSTRACT

A vehicle system includes at least one autonomous driving sensor programmed to output environment signals representing an environment around an autonomous vehicle and object detection signals representing an object or person on an exterior surface of the autonomous vehicle. The vehicle system further includes an autonomous mode controller programmed to autonomously control the autonomous vehicle in accordance with the environment signals output by the autonomous driving sensor, detect the object or person on the exterior surface of the autonomous vehicle in accordance with the object detection signals, and limit autonomous operation of the autonomous vehicle in response to detecting the object or person on the exterior surface of the autonomous vehicle.

20 Claims, 2 Drawing Sheets

(56) References Cited

U.S. PATENT DOCUMENTS

| | | | |
|---|---|---|---|
| 2015/0338852 A1* | 11/2015 | Ramanujam | G01C 21/26 |
| | | | 701/2 |
| 2015/0346727 A1* | 12/2015 | Ramanujam | B62D 15/0285 |
| | | | 701/23 |
| 2016/0161266 A1* | 6/2016 | Crawford | G01C 21/34 |
| | | | 701/25 |
| 2016/0306030 A1* | 10/2016 | Hara | G01S 7/4813 |
| 2016/0332535 A1* | 11/2016 | Bradley | B60N 2/002 |
| 2016/0378244 A1* | 12/2016 | Bandyopadhyay | G06F 1/1692 |
| | | | 345/177 |
| 2017/0080900 A1* | 3/2017 | Huennekens | B60R 25/31 |
| 2017/0153714 A1* | 6/2017 | Gao | G06F 3/017 |
| 2017/0219362 A1* | 8/2017 | Bryson | G01C 21/34 |

\* cited by examiner

VEHICLE EXTERIOR SURFACE OBJECT DETECTION

BACKGROUND

Autonomous vehicles assume certain vehicle tasks otherwise handled by a traditional vehicle driver. Autonomous vehicles can navigate to a specific destination by controlling the steering, acceleration, braking, etc., by relying on sensors or other resources to detect nearby vehicles, pedestrians, and objects in or near the road. The autonomous vehicle is controlled according to the signals output by these sensors.

DETAILED DESCRIPTION

Figure 1:
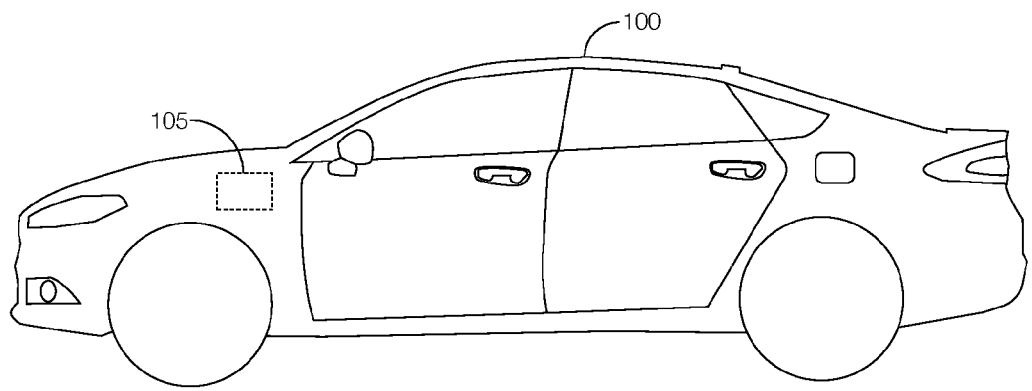
FIG. 1 illustrates an example autonomous vehicle with a vehicle system for detecting an object on the autonomous vehicle and limiting autonomous use if an object is detected.

Some autonomous vehicles can operate without any human interaction. Thus, an autonomous vehicle can be sent to pick up a potential passenger at a pickup location, where the potential passenger may enter the autonomous vehicle, and take the passenger to his or her destination. Because the autonomous vehicle does not have a human driver or anyone else present during portions of its operation, some individuals may attempt to take advantage of the autonomous vehicle. For instance, an individual may hold onto an exterior of the autonomous vehicle in an attempt to get a free ride or place an object on the autonomous vehicle to impermissibly transport the object.

Other situations may cause an unauthorized object to be on the exterior surface of the autonomous vehicle. For instance, a tree branch may fall onto the vehicle. In this situation, the object may impede the normal operation of the vehicle by, e.g., preventing the sensors from accurately capturing data, which in turn may make it difficult for the autonomous vehicle to navigate. Alternatively, the fallen branch may simply cause sufficient damage that prevents or severely limits autonomous vehicle operations. Without a human supervisor, such issues may go undetected until the autonomous vehicle arrives at the pickup location.

One way to address such issues is with an autonomous vehicle where the autonomous driving sensors can output both environment signals and object detection signals. Environment signals represent an environment around an autonomous vehicle. Object detection signals represent an object or person on an exterior surface of the autonomous vehicle. The vehicle system further includes an autonomous mode controller that autonomously controls the autonomous vehicle in accordance with the environment signals output by the autonomous driving sensor, detects the object or person on the exterior surface of the autonomous vehicle in accordance with the object detection signals, and limits autonomous operation of the autonomous vehicle in response to detecting the object or person on the exterior surface of the autonomous vehicle. The operation of one or more of the autonomous driving sensors (i.e., whether the autonomous driver sensor is generating the environment signal or the object detection signal) may change based on whether the autonomous vehicle is moving or stationary. Thus, at any time while parked or while navigating to the pickup location or a destination location, the autonomous vehicle may look for unauthorized persons or objects on the exterior surface of the host vehicle. And by limiting the autonomous operation of the vehicle in response to detecting an unauthorized object or person, the vehicle system addresses issues where an unauthorized person attempts to be transported by the autonomous vehicle, where someone attempts to use the autonomous vehicle to transport unauthorized objects, or when an unexpected object on the autonomous vehicle interferes with autonomous vehicle operations.

In the Figures, like numerals indicate like elements throughout the several views and the elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

FIG. 1 illustrates an autonomous host vehicle 100 with vehicle system 105 that detects unauthorized objects or people on the exterior surface of the autonomous host vehicle 100. The vehicle system 105 controls whether in-vehicle sensors, discussed below, output environment signals or object detection signals. Examples of environment signals include signals representing the environment around the host vehicle 100. Environment signals may represent other vehicles, lane markers, road signs, pedestrians, trees, sidewalks, crosswalks, traffic control devices (i.e., stop lights), etc. Examples of object detection signals include signals indicating that an object or person is present on an exterior surface of the host vehicle 100. The object detection signals, therefore, may indicate that an unauthorized object or person is on the hood, trunk, roof, bumper, etc., of the host vehicle 100.

The vehicle system 105 autonomously controls the host vehicle 100 in accordance with the environment signals. Moreover, the vehicle system 105 uses the object detection signals to determine whether an unauthorized object or person is present on the exterior surface of the host vehicle 100. If an unauthorized object or person is detected, the vehicle system 105 limits autonomous operation of the host vehicle 100, which may include preventing the host vehicle 100 from operating autonomously until the unauthorized object or person can be addressed. Another option includes navigating the host vehicle 100 to a police station or other designated area when an unauthorized object or person is detected on the exterior surface of the host vehicle 100.

Although illustrated as a sedan, the host vehicle 100 may include any passenger or commercial automobile such as a car, a truck, a sport utility vehicle, a crossover vehicle, a van, a minivan, a taxi, a bus, etc. The host vehicle 100 may operate in various modes including an autonomous (e.g., driverless) mode, a partially autonomous mode, and/or a non-autonomous mode.

Figure 2:
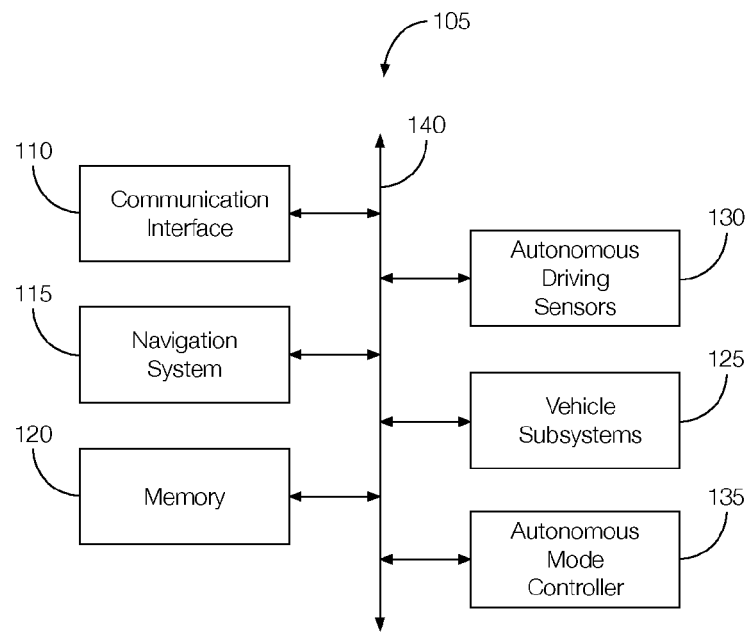
FIG. 2 illustrates example components of the vehicle system of FIG. 1.

FIG. 2 illustrates example components of the vehicle system 105. The example components include a communication interface 110, a navigation system 115, a memory 120, multiple vehicle subsystems 125, at least one autonomous driving sensor 130, and an autonomous mode controller 135. At least some of the components may be in communication with one another over a communication bus 140, which may include hardware for facilitating communication among and between various components of the host vehicle 100. The communication bus 140, for example, can be implemented via a Controller Area Network (CAN) bus. Alternatively, the communication bus 140 can be implemented via other wired or wireless communication protocols such as Ethernet, Wi-Fi, Bluetooth®, Bluetooth Low Energy®, etc.

The communication interface 110 is implemented via circuits, chips, or other electronic components that can wirelessly communicate with, e.g., a remote device such as a smartphone, a laptop computer, a desktop computer, or the like. The communication interface 110 may be programmed to transmit and receive messages in accordance with any number of wireless communication protocols. The communication interface 110 may communicate received messages to other vehicle components or store received messages in the memory 120 so that they may be accessed by other components of the vehicle subsystem. In one possible implementation, the communication interface 110 may be programmed to receive a pickup request, with a pickup location, from a remote device used by an authorized passenger and communicate the pickup location to the navigation system 115. Moreover, the communication interface 110 may transmit messages according to instructions generated by other vehicle components. For instance, the communication interface 110 may transmit messages to a vehicle control center (e.g., a dispatch location), a police station, or an authorized person when an unauthorized object or person is detected on the exterior surface of the host vehicle 100. The communication interface 110 may further transmit messages, including a message indicating that an unauthorized object or person is present on the exterior surface of the host vehicle 100, to a user interface in the passenger compartment of the host vehicle 100 so that instructions may be provided to any authorized passengers in the host vehicle 100.

The navigation system 115 is implemented via circuits, chips, or other electronic components that can determine a current location of the host vehicle 100, determine a destination location of the host vehicle 100, and generate a route from the current location to the destination location. The navigation system 115 may develop the route in response to, e.g., the pickup request received via the communication interface 110, a command from the autonomous mode controller 135, etc. The navigation system 115 may determine the current location in accordance with a positioning system such as the Global Positioning System (GPS). Using virtual maps, the navigation system 115 may develop the route from the current location to the destination location and output signals to other vehicle components concerning the route. For instance, the navigation system 115 may output signals related to the route to the autonomous mode controller 135.

The memory 120 is implemented via circuits, chips, or other electronic components that can electronically store data. The memory 120 may, for instance, store the pickup location received from the remote device of the authorized person, contact information for the authorized person, contact information for a vehicle control center, the destination, particular designated areas, etc. In addition to data, the memory 120 can store computer-executable instructions for performing various processes. The data, computer-executable instructions, or both, may be made available to other components of the vehicle system 105.

The vehicle subsystems 125 include components of the host vehicle 100 that are under the control of the autonomous mode controller 135 when the host vehicle 100 is operating in the autonomous mode. Examples of vehicle subsystems 125 include a steering wheel, a brake pedal, an accelerator pedal, etc. Moreover, the vehicle subsystems 125 may include various controllers associated with, e.g., the steering wheel, the brake pedal, the accelerator pedal, or the like. In one possible approach, the vehicle subsystems 125 further include actuators that receive signals output by the autonomous mode controller 135 and act on, e.g., the steering wheel, brake pedal, accelerator pedal, etc., in accordance with the signals received from the autonomous mode controller 135.

The autonomous driving sensors 130 are implemented via circuits, chips, or other electronic components that can operate in different modes including an environment mode and an object detection mode. Examples of autonomous driving sensors 130 may include a radar sensor, a lidar sensor, a vision sensor (e.g., a camera), an ultrasonic sensor, or the like. The autonomous driving sensors 130 may operate in the various modes based on command signals output by the autonomous mode controller 135, discussed in greater detail below. An autonomous driving sensor 130 operating in the environment mode may sense the environment around the host vehicle 100 and output environment signals representing the sensed environment. The autonomous driving sensors 130 may operate in the environment mode when, e.g., the host vehicle 100 is in the autonomous mode of operation, moving, or both. An autonomous driving sensor 130 may operate in the object detection mode when the host vehicle 100 is not operating in the autonomous mode of operation or when the vehicle is stationary, even if the host vehicle 100 is operating in the autonomous mode (e.g., stopped at a red light or stop sign). Both the environment signals and the object detection signals may be output to the autonomous mode controller 135. Moreover, some autonomous driving sensors 130 may operate in the environment mode while one or more other autonomous driving sensors 130 may operate in the object detection mode. In other words, all autonomous driving sensors 130 need not operate in the same mode as one another all the time.

Various autonomous driving sensors 130 may be located on the interior or exterior of the host vehicle 100. For instance, cameras may be located on the interior and exterior of the host vehicle 100, including the front or rear bumper, the sideview mirrors, the rearview mirror, on the trunk, etc., and may have at least partial views of the exterior body of the host vehicle 100. Radar or lidar sensors may be located on, e.g., the front and rear bumpers, on top of the host vehicle 100, on the sideview mirrors, on the rearview mirror, etc., and may have at least partial views of the exterior body of the host vehicle 100. Likewise, ultrasound sensors may be located on the front or rear bumper, the sideview mirrors, the rearview mirrors, etc., with at least a partial view of the body of the host vehicle 100. Even though one autonomous driving sensor 130 may not have a complete view of the entire exterior surface of the host vehicle 100, the collection of autonomous driving sensors 130 may output sufficient object detection data for the autonomous mode controller 135 to detect the unauthorized object or person on the exterior surface of the host vehicle 100.

In some instances, the autonomous driving sensors 130 may be programmed to passively detect the unauthorized object or person, even when operating in the environment mode. For instance, the autonomous driving sensors 130 may output the object detection signal when the object detection sensors are unable to detect the environment around the host vehicle 100. One reason an autonomous driving sensor 130 may not be able to detect the environment around the host vehicle 100 includes if one or more of the autonomous driving sensors 130 is blocked by the unauthorized object or person. Under such circumstances, the blocked autonomous driving sensor 130 may output the object detection signal even if the autonomous driving sensor 130 is otherwise operating in the environment mode.

The autonomous mode controller 135 is implemented via circuits, chips, or other electronic components that can autonomously control the autonomous vehicle in accordance with the environment signals and object detection signals output by the autonomous driving sensor 130. While the host vehicle 100 is operating in the autonomous mode, the autonomous mode controller 135 may output control signals to various vehicle subsystems 125, including actuators, associated with the steering, acceleration, and braking of the host vehicle 100 in accordance with the environment signals output by the autonomous driving sensors 130. When the host vehicle 100 is stopped while operating in the autonomous mode, the autonomous mode controller 135 may receive the object detection signals output by the autonomous driving sensors 130. With the object detection signals, the autonomous mode controller 135 can detect the unauthorized object or person on the exterior surface of the autonomous vehicle. If an unauthorized object or person is detected on the exterior surface of the host vehicle 100, the autonomous mode controller 135 may limit autonomous operation of the autonomous vehicle. Limiting the autonomous operation of the host vehicle 100 may include preventing the autonomous vehicle from autonomously navigating to the pickup location to pick up the authorized passenger.

The autonomous mode controller 135 may control the operating mode of the autonomous driving sensors 130. For instance, the autonomous mode controller 135 may output a first command signal commanding the autonomous driving sensors 130 to operate in the environment mode. The autonomous mode controller 135 may output a second command signal commanding the autonomous driving sensors 130 to operate in the object detection mode. The autonomous mode controller 135 may be programmed to output the first command signal any time the host vehicle 100 is operating in the autonomous mode, even when the host vehicle 100 is stationary. The autonomous mode controller 135 may be programmed to output the second command signal only when the host vehicle 100 is stopped. This way, the autonomous driving sensors 130 may be used to detect the environment around the vehicle while the host vehicle 100 is stationary or moving but used to detect unauthorized objects or persons only when the host vehicle 100 is stationary.

After receiving the object detection signal, the autonomous mode controller 135 may process the object detection signal and determine whether the object detection signal indicates an unauthorized object or person on the exterior surface of the host vehicle 100. Processing the object detection signal may include, e.g., processing an image captured by an interior or exterior vehicle camera, processing radar or lidar signals with at least partial views of the body of the host vehicle 100, processing signals from an ultrasound sensor with at least a partial view of the body of the host vehicle 100, or the like. When the unauthorized object or person is detected, the autonomous mode controller 135 may limit the autonomous operation of the host vehicle 100.

In some possible approaches, the autonomous mode controller 135 may not limit autonomous operation immediately upon detecting the unauthorized person or object. Rather, the autonomous mode controller 135 may be programmed to determine if the unauthorized object or person has been on the exterior surface of the host vehicle 100 for at least a predetermined amount of time. For instance, the autonomous mode controller 135 may wait the predetermined amount of time before taking any remedial action associated with the unauthorized object or person. Thus, if someone briefly sets a shopping bag on the trunk of the host vehicle 100 or briefly places his or her foot on the bumper to tie his or her shoe, no action may be taken by the autonomous host vehicle 100. Moreover, waiting the predetermined amount of time may give the autonomous mode controller 135 time to alert the person to remove him or herself, the object, or both from the exterior surface of the host vehicle 100. The predetermined amount of time may balance giving someone time to remove him or herself, the object, or both from the exterior surface of the host vehicle 100 with proceeding to the destination location to limit the inconvenience to authorized passengers. For instance, the predetermined amount of time may be on the order of, e.g., 30 seconds, one minute, two minutes, etc. If the unauthorized object or person remains after the predetermined amount of time has elapsed, the autonomous mode controller 135 may limit autonomous operation of the host vehicle 100 by, e.g., preventing the host vehicle 100 from operating autonomously, at least temporarily (i.e., until the unauthorized object or person is removed).

Another possible action that may be taken by the autonomous mode controller 135, besides, for example, preventing the host vehicle 100 from operating autonomously, is to navigate the host vehicle 100 to a designated area in response to detecting the unauthorized object or person. Examples of designated areas may include a police station, a parking lot (e.g., to move the host vehicle 100 out of the road), a vehicle control center (i.e., a location from which the host vehicle 100 was dispatched), or the like. A human at the designated area may then address the unauthorized object or person on the host vehicle 100.

The autonomous mode controller 135 may further command the communication interface 110 to transmit the message to the authorized passenger, the vehicle control center, or other persons or entities who might be interested in investigating the unauthorized object or person on the exterior surface of the host vehicle 100. For instance, the autonomous mode controller 135 may output a signal to the communication interface 110 commanding the communication interface 110 to generate and transmit the message. The contact information for the destination of the message may be retrieved from the memory 120.

In some possible implementations, the autonomous mode controller 135 may not make decisions about whether an object is detected. For instance, a separate processor may process the object detection signals and output a signal, representing the presence of unauthorized objects or persons on the exterior surface of the host vehicle 100, to the autonomous mode controller 135. In some instances, that processor may be incorporated into one or more of the autonomous driving sensors 130.

Figure 3:
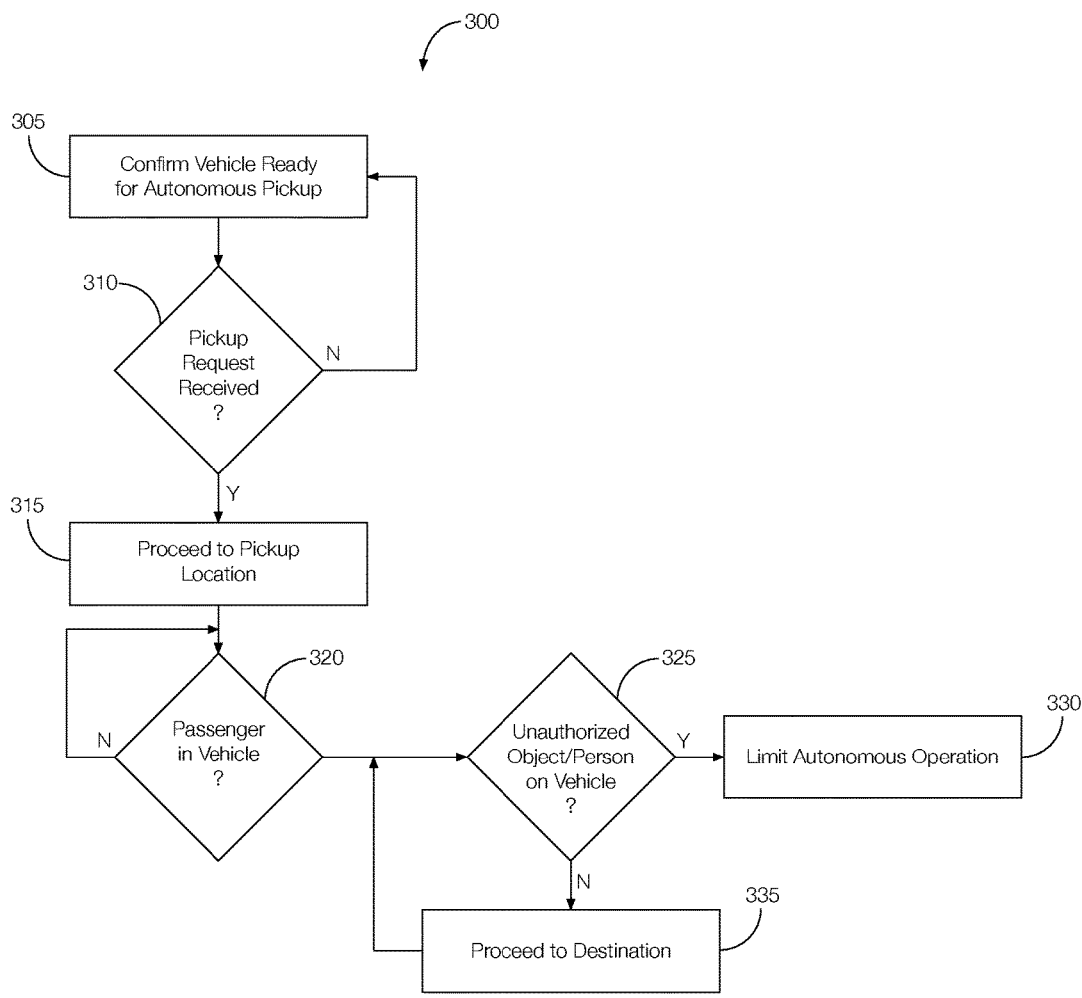
FIG. 3 is a flowchart of an example process that may be executed by the vehicle system.

FIG. 3 is a flowchart of an example process 300 that may be executed by the vehicle system 105. The process 300 may begin any time the host vehicle 100 is ready to operate in an autonomous or at least partially autonomous mode to pick up the authorized passenger. The process 300 can continue to execute until the host vehicle 100 is turned off or no longer operating in an autonomous or partially autonomous mode.

At block 305, the vehicle system 105 confirms that the host vehicle 100 is ready to autonomously pick up authorized passengers. That is, the autonomous mode controller 135 may communicate with various systems of the host vehicle 100 to determine whether the host vehicle 100 is ready for autonomous operation. In some instances, the autonomous mode controller 135 may further command the communication interface 110 to communicate with the vehicle control center with a message indicating that the host vehicle 100 is ready to receive and respond to pickup requests. After the autonomous mode controller 135 confirms that the host vehicle 100 is ready to operate in the autonomous mode, the process 300 may proceed to block 310.

At decision block 310, the vehicle system 105 may determine whether a pickup request has been received. The pickup request may be received by the communication interface 110 and transmitted to the memory 120, the autonomous mode controller 135, or both. If a pickup request is received, the process 300 may proceed to block 315. Otherwise, the process 300 may wait until the pickup request is received.

At block 315, the vehicle system 105 may proceed to the pickup location. For instance, the navigation system 115 may access the pickup request from the memory 120 and determine the pickup location from the pickup request. The navigation system 115 may further determine the current location of the host vehicle 100, determine the destination location (from the pickup request), and develop a route from the current location of the host vehicle 100 to the pickup location, from the pickup location to the destination location, or both. The navigation system 115 may output the route to the autonomous mode controller 135. The autonomous mode controller 135 may command the autonomous driving sensors 130 to operate in the environment mode and begin controlling various vehicle subsystems 125 to navigate the host vehicle 100 to the pickup location. This may include the autonomous mode controller 135 outputting signals to control the steering, braking, and acceleration of the host vehicle 100 based on the environment signals received from the autonomous driving sensors 130.

At decision block 320, the vehicle system 105 determines whether the authorized passenger has boarded the host vehicle 100. The authorized passenger may communicate that he or she is in the host vehicle 100 via a user input made inside the host vehicle 100. The user input may be received via, e.g., a user interface (such as an infotainment system) with a touchscreen, via the user's remote device, or the like. The user input may be received via the communication interface 110 and communicated to the memory 120, the autonomous mode controller 135, or both. When the user input is received, the process 300 may proceed to block 325. Otherwise, block 320 may be repeated until the user input is received.

At decision block 325, the vehicle system 105 may determine whether an unauthorized object or person is on the exterior surface of the host vehicle 100. The autonomous mode controller 135 may command one or more autonomous driving sensors 130 to operate in the object detection mode, at least temporarily, to look for unauthorized objects or persons on the exterior surface of the host vehicle 100. In some instances, the autonomous mode controller 135 may only command the autonomous driving sensors 130 to operate in the object detect mode when the host vehicle 100 is stationary. The autonomous mode controller 135 may receive and process the object detection signals, if any, output by the autonomous driving sensors 130. Alternatively, the autonomous mode controller 135 may determine that an unauthorized object or person is on the exterior surface of the host vehicle 100 while the host vehicle 100 is moving or stationary if something is preventing one or more of the autonomous driving sensors 130 from operating in the environment mode (e.g., interfering with the ability of the autonomous driving sensor 130 to detect the environment around the host vehicle 100). If an unauthorized object or person is detected, the process 300 may proceed to block 330. In some instances, the process 300 may only proceed to block 330 if the unauthorized object or person is on the exterior surface of the host vehicle 100 for at least a predetermined amount of time. If no unauthorized objects or persons are detected, which the autonomous mode controller 135 may determine after a predetermined amount of time after placing the autonomous driving sensors 130 in the object detection mode and not receiving an object detection signal, the process 300 may proceed to block 335.

At block 330, the vehicle system 105 may limit the autonomous operation of the host vehicle 100. Limiting the autonomous operation of the host vehicle 100 may include the autonomous mode controller 135 preventing the autonomous vehicle from autonomously navigating to the pickup location to pick up the authorized passenger. Alternatively, limiting the autonomous operation of the host vehicle 100 may include the autonomous mode controller 135 navigating the host vehicle 100 to a designated area such as a police station, a parking lot, a vehicle control center, etc. Moreover, at block 330, the autonomous mode controller 135 may command the communication interface 110 to transmit a message to the authorized passenger indicating that the host vehicle 100 is delayed, a message to the police or vehicle control center indicating that an unauthorized object or person is on the exterior surface of the host vehicle 100, or the like. The message to the police or vehicle control center may include camera images captured by one or more of the autonomous driving sensors 130.

At block 335, the vehicle system 105 authorizes the host vehicle 100 to proceed to the destination location. For instance, the autonomous mode controller 135 may command the autonomous driving sensors 130 to operate in the environment mode and begin controlling various vehicle subsystems 125 to navigate the host vehicle 100 to the destination location. This may include the autonomous mode controller 135 outputting signals to control the steering, braking, and acceleration of the host vehicle 100 based on the environment signals received from the autonomous driving sensors 130. The process 300 may return to block 325 periodically (e.g., every 30 seconds, every minute, every two minutes, etc.) or in response to predetermined events, such as when the host vehicle 100 comes to a stop since that is most likely when an unauthorized object or person will be placed on the exterior surface of the host vehicle 100 and since that is when at least some of the autonomous driving sensors 130 may be free to temporarily operate in the object detection mode.

The process 300 may end when the host vehicle 100 reaches its destination. Alternatively, the process 300 may return to block 310 to await the next pickup request. Moreover, certain blocks, such as blocks 325, 330, and 335 may continue to be executed while the host vehicle 100 is traveling from one destination location to the next pickup location (e.g., in between passenger pickups).

With the process 300, the vehicle system 105 may, at any time while the host vehicle 100 is parked or while navigating to the destination location, look for unauthorized persons or objects on the exterior surface of the host vehicle 100. And by limiting the autonomous operation of the host vehicle 100 in response to detecting an unauthorized object or person, the vehicle system 105 addresses issues where an unauthorized person attempts to be transported by the autonomous vehicle, where someone attempts to use the autonomous vehicle to transport unauthorized objects, or when an unexpected object on the autonomous vehicle interferes with autonomous vehicle operations.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    at least one autonomous driving sensor programmed to output environment signals representing an environment around an autonomous vehicle and object detection signals representing an object or person on an exterior surface of the autonomous vehicle;
    an autonomous mode controller programmed to autonomously control the autonomous vehicle in accordance with the environment signals output by the autonomous driving sensor, detect the object or person on the exterior surface of the autonomous vehicle in accordance with the object detection signals, and limit autonomous operation of the autonomous vehicle in response to detecting the object or person on the exterior surface of the autonomous vehicle.

2. The vehicle system of claim 1, further comprising a communication interface programmed to receive a ride request identifying a pickup location.

3. The vehicle system of claim 2, wherein the autonomous mode controller is programmed to limit autonomous operation of the autonomous vehicle by preventing the autonomous vehicle from autonomously navigating to the pickup location in response to detecting the object or person on the exterior surface of the autonomous vehicle.

4. The vehicle system of claim 1, wherein the autonomous driving sensor is programmed to output the object detection signals when the autonomous vehicle is stationary.

5. The vehicle system of claim 1, wherein the autonomous mode controller is programmed to output one of a first command signal and a second command signal to the autonomous driving sensor, the first command signal commanding the autonomous driving sensor to output the environment signal and the second command signal commanding the autonomous driving sensor to output the object detection signal.

6. The vehicle system of claim 5, wherein the autonomous mode controller is programmed to output the second command signal while the autonomous vehicle is stationary.

7. The vehicle system of claim 1, wherein the autonomous mode controller is programmed to determine whether the object or person has been on the exterior surface of the autonomous vehicle for at least a predetermined amount of time based at least in part on the object detection signal.

8. The vehicle system of claim 7, wherein the autonomous mode controller is programmed to limit autonomous operation of the autonomous vehicle by preventing the autonomous vehicle from operating autonomously in response to detecting that the object or person has been on the exterior surface of the autonomous vehicle for at least the predetermined amount of time.

9. The vehicle system of claim 1, wherein the autonomous driving sensor is programmed to output the object detection signal in response to the object or person on the exterior surface of the autonomous vehicle interfering with the autonomous driving sensor.

10. The vehicle system of claim 1, further comprising a communication interface programmed to transmit a message indicating that the object or person has been detected on the exterior surface of the autonomous vehicle.

11. The vehicle system of claim 1, wherein the autonomous mode controller is programmed to autonomously navigate the autonomous vehicle to a designated area in response to detecting the object or person on the exterior surface of the autonomous vehicle, wherein the designated area includes at least one of a police station, a parking lot, and a vehicle control center.

12. A method comprising:
    receiving environment signals representing an environment around an autonomous vehicle;
    receiving object detection signals representing an object or person on an exterior surface of the autonomous vehicle;
    detecting the object or person on the exterior surface of the autonomous vehicle in accordance with the object detection signals; and
    limiting autonomous operation of the autonomous vehicle in response to detecting the object or person on the exterior surface of the autonomous vehicle.

13. The method of claim 12, further comprising autonomously controlling the autonomous vehicle in accordance with the environment signals if no objects or persons are detected on the exterior surface of the autonomous vehicle.

14. The method of claim 12, further comprising receiving a ride request identifying a pickup location and wherein limiting autonomous operation of the autonomous vehicle includes preventing the autonomous vehicle from autonomously navigating to the pickup location in response to detecting the object or person on the exterior surface of the autonomous vehicle.

15. The method of claim 12, wherein the object detection signals are received when the autonomous vehicle is stationary.

16. The method of claim 12, further comprising one of commanding an autonomous driving sensor to output the environment signal and commanding the autonomous driving sensor to output the object detection signal, wherein the autonomous driving sensor is commanded to output the object detection signal only while the autonomous vehicle is stationary.

17. The method of claim 12, further comprising determining whether the object or person has been on the exterior surface of the autonomous vehicle for at least a predetermined amount of time and wherein limiting autonomous operation of the autonomous vehicle includes preventing the autonomous vehicle from operating autonomously in response to detecting that the object or person has been on the exterior surface of the autonomous vehicle for at least the predetermined amount of time.

18. The method of claim 12, wherein receiving the object detection signal includes receiving the object detection signal in response to the object or person on the exterior surface of the autonomous vehicle interfering with the autonomous driving sensor.

19. The method of claim 12, further comprising transmitting a message indicating that the object or person has been detected on the exterior surface of the autonomous vehicle.

20. The method of claim 12, wherein limiting the autonomous operation of the autonomous vehicle includes autonomously navigating the autonomous vehicle to a designated area in response to detecting the object or person on the exterior surface of the autonomous vehicle, wherein the designated area includes at least one of a police station, a parking lot, and a vehicle control center.

* * * * *